Oct. 1, 1968  J. W. DAVIDSON ET AL  3,403,488
BUILDING PANEL WITH A SYNTHETIC PLASTIC SHELL
Filed Aug. 30, 1965
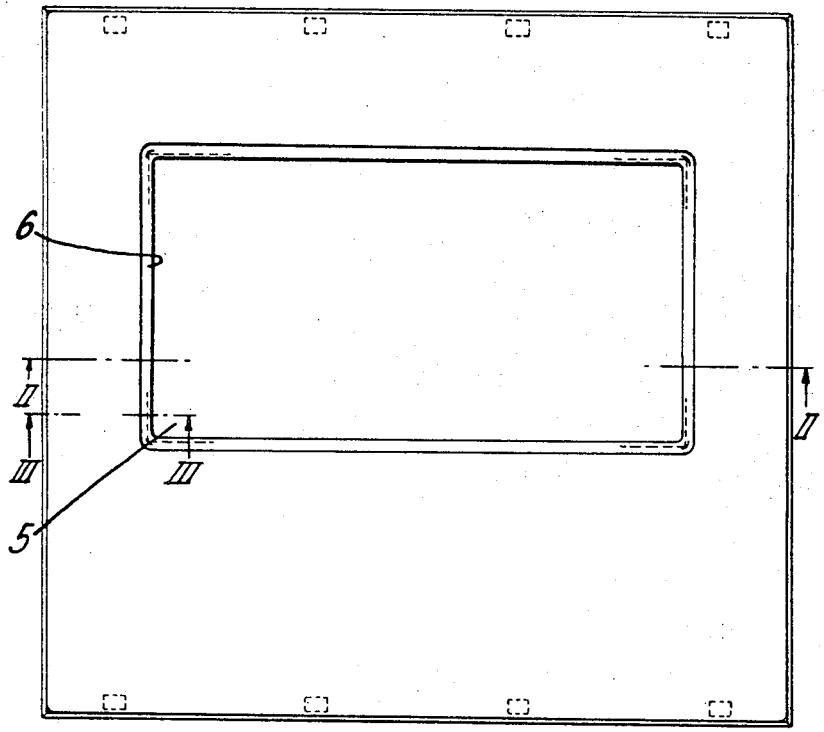
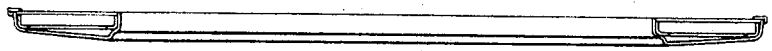
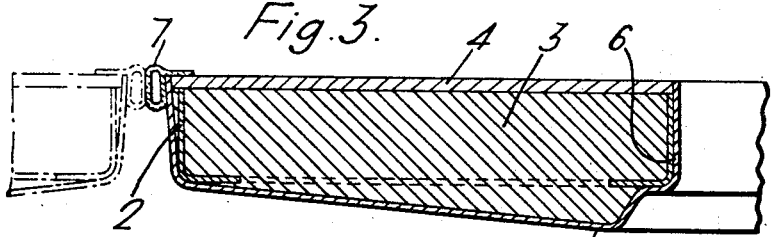
JOHN WINGATE DAVIDSON
CLIVE RODON BROOKS
EDWIN JOHN VOISEY    INVENTORS
JOHN DENIS BURTON
BY
Morgan, Finnegan, Durham & Pine
ATTORNEY

United States Patent Office 3,403,488
Patented Oct. 1, 1968

3,403,488
BUILDING PANEL WITH A SYNTHETIC PLASTIC SHELL
John Wingate Davidson and Clive Rodon Brooks, London, Edwin John Voisey, Hutton, Essex, and John Denis Burton, London, England, assignors to The Greater London Council, London, England, a British body corporate and John Wingate Davidson, Clive Rodon Brooks, both of London, England, and Edwin John Voisey, Hutton, Essex, England
Filed Aug. 30, 1965, Ser. No. 483,590
9 Claims. (Cl. 52—204)

ABSTRACT OF THE DISCLOSURE

This invention relates to a building panel for the construction of prefabricated multi-storey buildings, the shell of the panel being made of a synthetic plastics material and the periphery of panel being provided with a resilient sealing means.

---

The invention relates to building panels for the construction of buildings of one or more storey and the like, and in particular relates to panels for the external wall cladding of such buildings.

The invention has among its objects to provide a light-weight prefabricated panel which is relatively cheap to produce; which complies fully with all the standard requirements as to fire and building regulations; which can be easily mounted in position and which is fully weather-proof at the joints and which can be easily replaced.

According to the invention there is provided a building panel comprising a tray made from a fibre reinforced synthetic resinous material, a filler of an insulating material substantially filling the tray, and a fibrous backing sheet which, together with the tray, completely encloses the filler.

The synthetic plastics material used in the outer skin is preferably of polyester, epoxy, silicone or other suitable resin reinforced with glass-fibre or other suitable reinforcing medium or of asbestos filled phenolic resin.

Gasket means may be secured to the peripheral edges of the panel and formed as an endless tubular member with a laterally extending flange or flanges and secured at appropriate positions by epoxy or by other suitable resin to the panel skin at the edges, or secured by pins or by screws to the edges of the panel.

According to the invention moreover, the panels may be secured to the structure which may be a structural steel framework by fixing bolts to nuts welded to the panel; alternatively cleats may be inserted within the panel structure.

The panels are thus held in position and a weather-seal obtained both horizontally and in the vertical direction between adjacent panels by compressing together adjacent peripheral gaskets. The compression of the peripheral gasket is achieved by the action of locating panels to the accurate steel structure and bolting in position.

The panels may be secured to the framework from inside the building, thus eliminating the need for scaffolding, and the necessity for a separate frame structure.

In the production of a panel as hereinbefore described the outer skin is moulded but if desired the outer skin may be formed by hand using well-known moulding techniques and a reinforcement in the form of one or more strips of metal reinforcement secured for example, by means of an adhesive to the skin and provided at convenient positions with holes for the passage of screw bolts or the equivalent for securing the panel to the structure such, for example, as a steel framework, and endless gaskets provided which are flanged or otherwise formed for securing mechanically or by means of an adhesive to the perimeter of the panel.

Furthermore, the glass fibre-reinforced resin skin may be moulded to present cut away portions to receive window frames or the like, the skin being moulded to present external shoulders or recesses for conveniently receiving the window frames. Thus the window frame may be provided with an extension or a flange conveniently formed to seat on a shoulder moulded in the panel to be secured thereto mechanically or by means of an adhesive.

The invention further comprises the features of construction hereinafter described.

The invention is diagrammatically illustrated by way of example in the drawings accompanying the provisional specification, in which:

FIGURE 1 is a front elevation of a panel according to the invention;

FIGURE 2 is a section on the line II—II of FIGURE 1, and

FIGURE 3 is a section on the line III—III of FIGURE 1.

In the drawings 1 is the moulded skin or tray formed with a 3″ return edge around the panel and with a window aperture; 2 is the metal or other reinforcement; 3 is the filler; 4 is an asbestos insulation board bonded to the filler; 5 is a window aperture; 6 is the flange on which a window frame may seat; 7 is a neoprene gasket which is continuous around the panel and which is illustrated in the drawings in the compressed or mounted position in which the panels are weather-tight.

It will be understood that the panels which may for example be of storey height and of a width up to 20′0″ or more and with or without a window or other equivalent, may be conveniently raised into a position for securing to the structural steel frame by a crane and bolted in position. Work to secure the panel in position may be carried on in the building being erected, thus avoiding the necessity for the use of scaffolding. The panels may be slid horizontally into position, engagement of the respective gasket elements under pressure effecting sealing.

In addition to the advantages already mentioned, the panel according to the invention affords inside and outside finish; because of the seal no further treatment is required on the inside wall.

The tests carried out show that the external wall cladding according to the invention gives full weather, fire, and insulation protection, can be provided at relatively low cost; that an effective seal can be obtained between adjacent panels and that adequate stability against wind pressure can be obtained without the necessity for heavy structural members. Furthermore such a panel complies with the fire and building regulations.

What is claimed is:

1. A panel for construction of prefabricated buildings comprising a tray of a fiber reinforced synthetic resinous material, a filler including insulating material that substantially fills the tray, a fibrous backing sheet which, together with the tray, completely encloses the filler, reinforcements secured to the inner surface of the tray, and resilient sealing means extending around the peripheral edges of the panel.

2. A panel in accordance with claim 1 wherein the tray includes a base, first side members extending outwardly from the base along the periphery thereof and second side members being located at spaced intervals from the first side members and defining an aperture extending through the panel.

3. A panel in accordance with claim 2 wherein the reinforcements comprise a channel-shaped member having a first leg extending substantially adjacent the first side member of the tray and a second leg parallel to the first leg and extending adjacent the second side member of the tray.

4. A panel in accordance with claim 3 wherein the base of the tray slopes inwardly from the junction of the base and the first side member, said member being inclined outwardly from the base and the second side member includes a main body portion and a lower end having a portion extending perpendicular to the side member and a sloping portion joining the base to provide mounting means for a window frame.

5. A panel in accordance with claim 3 wherein the resilient sealing means comprises a gasket having a tubular portion mounted along the surface of first side member and having an arm extending outwardly therefrom and being mounted to the upper edge of the first side member and the upper portion of the backing sheet.

6. A panel in accordance with claim 3 wherein the tray comprises a glass fiber reinforced material selected from the group consisting of a polyester resin, an epoxy resin, or a silicone resin.

7. A panel in accordance with claim 3 wherein the tray consists essentially of an asbestos filled phenolic resin.

8. A panel in accordance with claim 3 wherein the filler comprises an expanded plastic material.

9. A panel in accordance with claim 3 wherein the filler consists essentially of foamed concrete.

References Cited

UNITED STATES PATENTS

| 2,263,806 | 11/1941 | Hammerl | 49—298 |
| 2,273,775 | 2/1942 | Strong | 52—405 |
| 2,584,626 | 2/1952 | Sherron | 52—309 X |
| 2,802,766 | 8/1957 | Leverenz. | |
| 3,080,267 | 3/1963 | Schmalz. | |
| 3,091,946 | 6/1963 | Kesling. | |
| 3,150,032 | 9/1964 | Rubenstein. | |

FOREIGN PATENTS

| 890,513 | 1962 | Great Britain. |
| 910,156 | 1962 | Great Britain. |

JOHN E. MURTAGH, *Primary Examiner.*